United States Patent
Chen

(10) Patent No.: US 12,119,784 B2
(45) Date of Patent: Oct. 15, 2024

(54) ARRAY SOLAR POWER GENERATION DEVICE

(71) Applicant: Sunny Rich Agric. & Biotech Co., Ltd., Taipei (TW)

(72) Inventor: Kuei-Kuang Chen, Taipei (TW)

(73) Assignee: Sunny Rich Agric. & Biotech Co., Ltd., Taipei (TW)

( * ) Notice: Subject to any disclaimer, the term of this patent is extended or adjusted under 35 U.S.C. 154(b) by 37 days.

(21) Appl. No.: 18/260,896

(22) PCT Filed: Jun. 18, 2019

(86) PCT No.: PCT/CN2019/091728
§ 371 (c)(1),
(2) Date: Jul. 10, 2023

(87) PCT Pub. No.: WO2020/252660
PCT Pub. Date: Dec. 24, 2020

(65) Prior Publication Data
US 2024/0056021 A1    Feb. 15, 2024

(51) Int. Cl.
*H02S 40/22*    (2014.01)
*H02S 20/00*    (2014.01)

(52) U.S. Cl.
CPC ............. *H02S 40/22* (2014.12); *H02S 20/00* (2013.01)

(58) Field of Classification Search
CPC ................................. H02S 40/20; H02S 40/22
See application file for complete search history.

(56) References Cited

U.S. PATENT DOCUMENTS

| 5,538,563 A * | 7/1996 | Finkl | H01L 31/0547 |
| | | | 136/246 |
| 2009/0235973 A1* | 9/2009 | Thomasson | F24S 30/48 |
| | | | 136/246 |

(Continued)

FOREIGN PATENT DOCUMENTS

| CN | 104883117 A | 9/2015 |
| CN | 204993212 U | 1/2016 |

(Continued)

OTHER PUBLICATIONS

English machine translation of Meissner (DE-102010048730-A1) provided by the EPO website, all pages, 2024. (Year: 2024).*

*Primary Examiner* — Daniel P Malley, Jr.
(74) *Attorney, Agent, or Firm* — Best & Flanagan LLP

(57) ABSTRACT

The present invention relates to an array solar power generation device, comprising a plurality of solar panels, a frame unit, a support unit and at least one reflecting device. A first light-receiving face and a second light-receiving face, which can receive light to generate power, are arranged at opposite positions on each of the solar panels; the frame unit is configured to connect the plurality of solar panels, and to enable the plurality of solar panels to be vertically and continuously arranged so as to form a continuous solar power generation module, enable a plurality of continuous solar power generation modules to be arranged in parallel so as to form an array solar power generation device, and enable adjacent continuous solar power generation modules to have a light transmission interval therebetween; the support unit is arranged below the frame unit; and the reflecting device is arranged below the light transmission interval of the adjacent continuous solar power generation modules and can reflect light rays to the first light-receiving face and the second light-receiving face of the continuous (Continued)

solar power generation module. Thus, the present invention is easy to mount, and has a high power generation efficiency and good applicability.

3 Claims, 17 Drawing Sheets

(56) References Cited

U.S. PATENT DOCUMENTS

2016/0141437 A1\* 5/2016 Asbeck .................. H02S 40/22
　　　　　　　　　　　　　　　　　　　　　　　136/246
2020/0153380 A1\* 5/2020 Hildebrandt .............. F16B 9/05

FOREIGN PATENT DOCUMENTS

CN　　　　207083048 U　　3/2018
DE　　102010048730 A1 \* 12/2011　......... H01L 31/0547

\* cited by examiner

ARRAY SOLAR POWER GENERATION DEVICE

TECHNICAL FIELD

The present invention relates to an array solar power generation device and, more particularly, to a power generation device which has enhanced power generation efficiency while permitting easy installation and having enhanced stability.

BACKGROUND TECHNIQUE

To reduce the air pollution caused by burning coals, currently used cleaner energies, such as optical energy, hydropower, wind power, etc. have received wide attention. Taking optical energy generation as an example, it mainly includes a solar panel and a supporting frame. The solar panel includes a side having a light receiving face which can receive light to generate electricity. Furthermore, the supporting frame is installed on the ground or on top of a building or a platform on a water surface. Furthermore, the solar panel is inclinedly disposed on the supporting frame, and the light receiving face on the upper side can be irradiated by the sunlight to convert the optical energy into electrical energy.

To further enhance the optical energy generation efficiency, light receiving faces capable of receiving light to generate electricity are currently disposed on two opposite sides of the solar panel, and either light receiving face irradiated by the sunlight can generate electricity to enhance the power generation efficiency. As sown in FIG. 17, one of a conventional solar power generation devices mainly includes a solar panel 1' and a reflecting board 2'. The solar panel 1' is disposed inclinedly, and first and second light receiving faces 11', 12' are disposed on two opposite sides of the solar panel 1'. Furthermore, the reflecting board 2' is disposed below the second light receiving face 12', such that the sunlight can directly irradiate the first light receiving face 11' on the upper side to generate electricity. Furthermore, the sunlight can irradiate the reflecting board 2', and the light rays can be reflected to the second light receiving face 12' to generate electricity, thereby enhancing the power generation efficiency.

However, the above structure requires a larger reflecting board 2' which will occupy a larger area. Furthermore, when the sun is facing the first light receiving face 11', the reflecting board 2' will be shielded, such that the second light receiving face 12' cannot be irradiated by the sunlight and, thus, cannot receive light to generate electricity. Furthermore, the upwardly facing first light receiving face 11' is apt to be contaminated by dust and bird droppings, reducing the power generation efficiency.

SUMMARY OF THE INVENTION

An objective of the present invention is to provide an array power generation device while having effects of enhanced power generation efficiency, easy installation, and enhanced stability.

The present invention comprises a plurality of solar panels, a frame unit, a supporting unit, and at least one reflecting device. Each of the plurality of solar panels has oppositely disposed first and second light receiving faces for receiving light to generate electricity and a side face extending in a direction perpendicular to the first and second light receiving faces. Furthermore, the frame unit provides coupling of the plurality of solar panels and enables the plurality of solar panels to stand upright and be arranged continuously, such that the first and second light receiving faces extend in a direction perpendicular to a ground or a water surface, and the side faces are aligned with each other, thereby forming a continuous solar power generation module. Furthermore, plural the continuous solar power generation modules may be arranged in parallel to form an array solar power generation device, and a light-transmission spacing is formed between adjacent continuous solar power generation modules. Furthermore, the supporting unit is disposed below the frame unit. Furthermore, the reflecting device is disposed in a lower end of the light-transmission spacing between the adjacent continuous solar power generation modules and configured to reflect light rays to the first and second light receiving faces of the continuous solar power generation modules.

The frame unit of the present invention includes a plurality of lower frame bodies, a plurality of upper frame bodies, and a plurality of connecting frames. The lower frame body is a rectilinear body and includes an upper end having a lower receiving groove which receives a bottom portion of the continuous solar power generation module. Furthermore, the upper frame body is a rectilinear body and includes a lower end having an upper receiving groove which receives a top portion of the continuous solar power generation module. Furthermore, the connecting frame interconnects adjacent upper frame bodies, such that adjacent continuous solar power generation modules have the light-transmission spacing therebetween.

The supporting unit of the present invention includes a plurality of connecting posts and a plurality of floats. Top ends of the connecting posts are securely mounted to lower ends of the lower frame bodies. Furthermore, the floats are coupled with lower ends of the connecting posts. The floats may be waste tires.

Furthermore, the reflecting device of the present invention may include first and second inclined board portions which are rectilinear sheets. A side of each of the first and second inclined board portions is coupled with a lower end of an associated continuous solar power generation module. The first and second inclined board portions are connected to each other at another sides thereof and can reflect light rays to the first and second light receiving faces of the solar panels.

Furthermore, a diffusing film for diffusing light rays is disposed on an upper end of the light-transmission spacing of the adjacent continuous solar power generation modules of the present invention.

Furthermore, a connecting position of the first and second inclined board portions of the reflecting device may be aligned with a position lower or higher than the bottom end of the associated continuous solar power generation module.

The reflecting device of the present invention may include first and second inclined board portions which are rectilinear sheets. A side of each of the first and second inclined board portions is pivotably connected to a lower end of the continuous solar power generation module. Furthermore, at least one transmission device is included. The transmission device can actuate the first inclined board portion and the second inclined board portion of plural reflecting devices to proceed with opening and closing movements. Furthermore, the first and second inclined board portions may include guiding grooves. Furthermore, two transmission devices are included. Each transmission device includes a telescopic rod and a connecting rod. The connecting rod of one of the transmission devices includes plural connecting portions concurrently coupled with the guiding grooves of plural first inclined board portions. The connecting rod of the other transmission device includes plural connecting portions concurrently coupled with the guiding grooves of plural second inclined board portions. The movement of the two telescopic rods can control the opening and closing movements of the first and second inclined board portion.

The reflecting device of the present invention may be disposed in the lower end of the light-transmission spacing between the continuous solar power generation modules and includes plural sheet portions assembled to form a plurality of protrusions which protrudes upwardly. Adjacent ends of longer sides of the sheet portions are connected. Each sheet portion includes an upper end protruding upward for connection and a lower end for connection. Outer sides of adjacent sheet portions which are on two sides of an associated upper end have different oriental inclinations to form diffusing faces. Light rays projected onto the sheet portions with different inclinations are reflected in different directions. Furthermore, a guiding device may be included. The guiding device can guide the reflecting device to open and close. Furthermore, the guiding device includes a track and a transmission member. The track is coupled with the lower end of the reflecting device, and the lower end is movable along the track. Furthermore, the transmission member includes a motor, a transmission belt, and a guiding wheel. The transmission belt is coupled with the motor and at least one sheet portion of each reflecting device. Furthermore, the guiding wheel is disposed on a side of the track and wound by the transmission belt. The motor may be controlled to actuate the sheet portions of the reflecting device to open or close and to adjust the angle of reflection of the sheet portions.

By adopting the above technical solutions, the present invention may achieve the following effects.

The plurality of solar panels of the present invention can be rapidly inserted into the upper and lower receiving grooves of the upper and lower frame bodies of the frame unit. The assembly is simple and easy. Furthermore, plural continuous solar power generation modules can be rapidly assembled according to needs, thereby forming an array solar power generation device having a large area. The present invention is applicable to be disposed on water, a swamp, a dry land, or other lands not suitable for cultivation, providing better applicability.

The present invention can respond to the angle of the sunlight to enable the first and second light receiving faces of the solar panels to directly receive light to generate electricity. Furthermore, when the sunlight is incident on the reflecting device via the light-transmission spacing between adjacent continuous solar power modules, the sunlight can be reflected by the reflecting device to the first and second light receiving faces of the solar panels to enhance the power generation efficiency. The solar panels of the present invention are disposed upright, such that the first and second light receiving faces are difficult to accumulate dust. Furthermore, when disposed on water, the reflecting device can provide shield and heat insulation while providing cold protection as well as providing a better growing environment for creatures cultivated therebelow.

When the present invention includes a transmission device or a guiding device, the light transmission rate below the reflecting device can be controlled. Furthermore, the light rays can be controlled according to the needs of the aquatic creatures therebelow, thereby enhancing the applicability of the need in the cultivation of aquatic creatures.

DESCRIPTION OF THE ACCOMPANYING DRAWINGS

Figure 1:
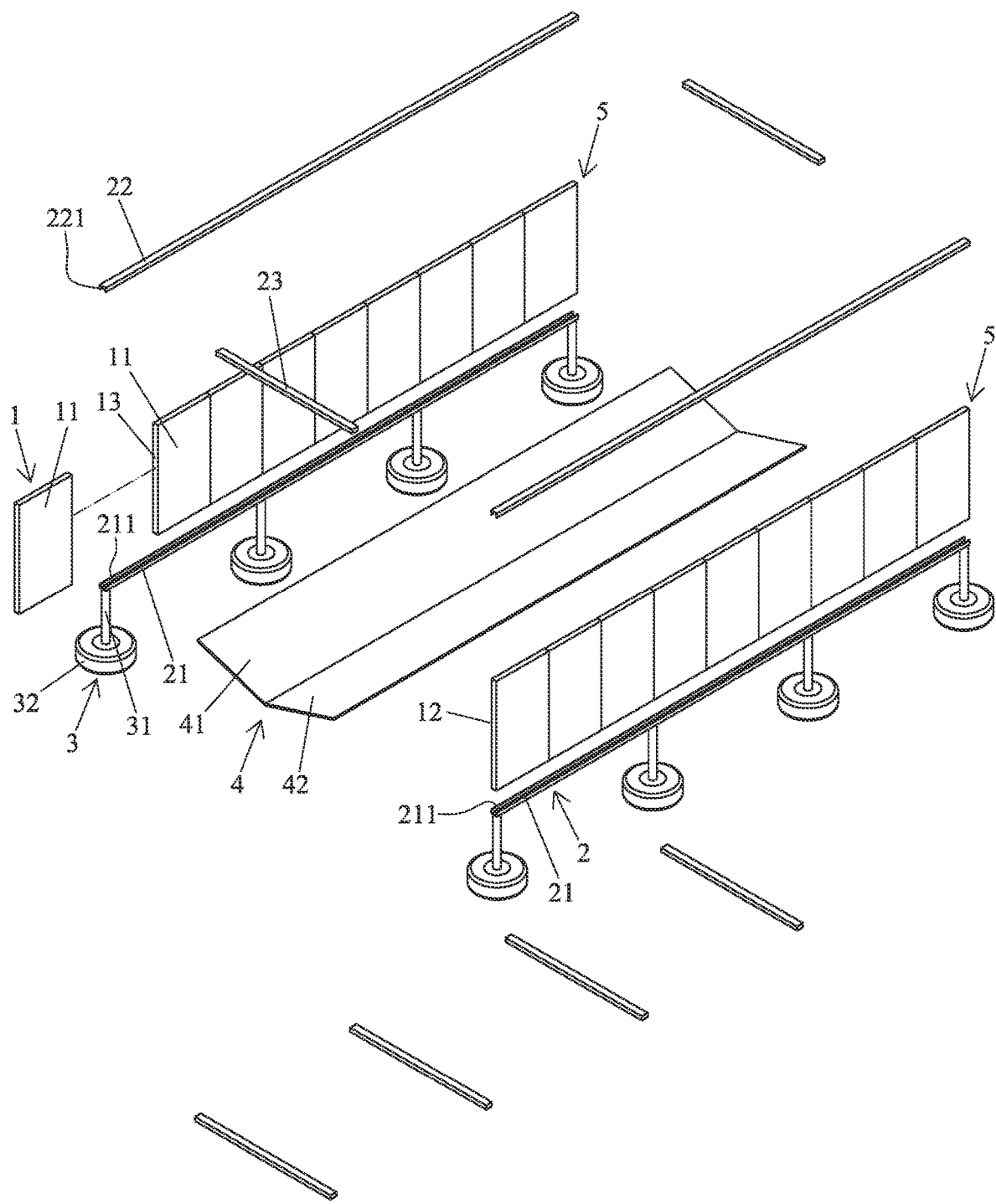
FIG. 1 is a partial, exploded, perspective view of a first embodiment of the present invention.
Figure 2:
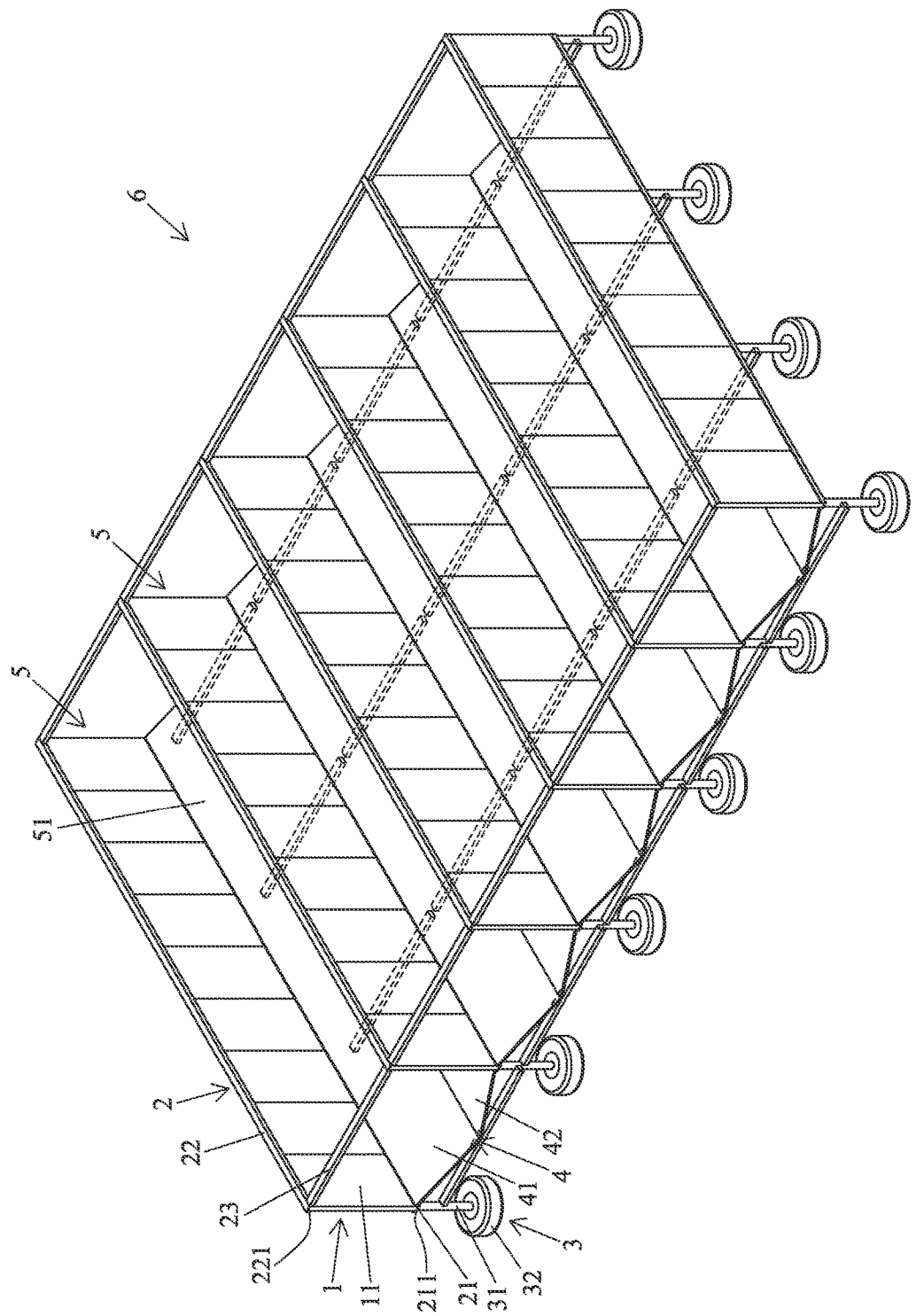
FIG. 2 is a perspective view of the first embodiment of the present invention after assembly.
Figure 3:
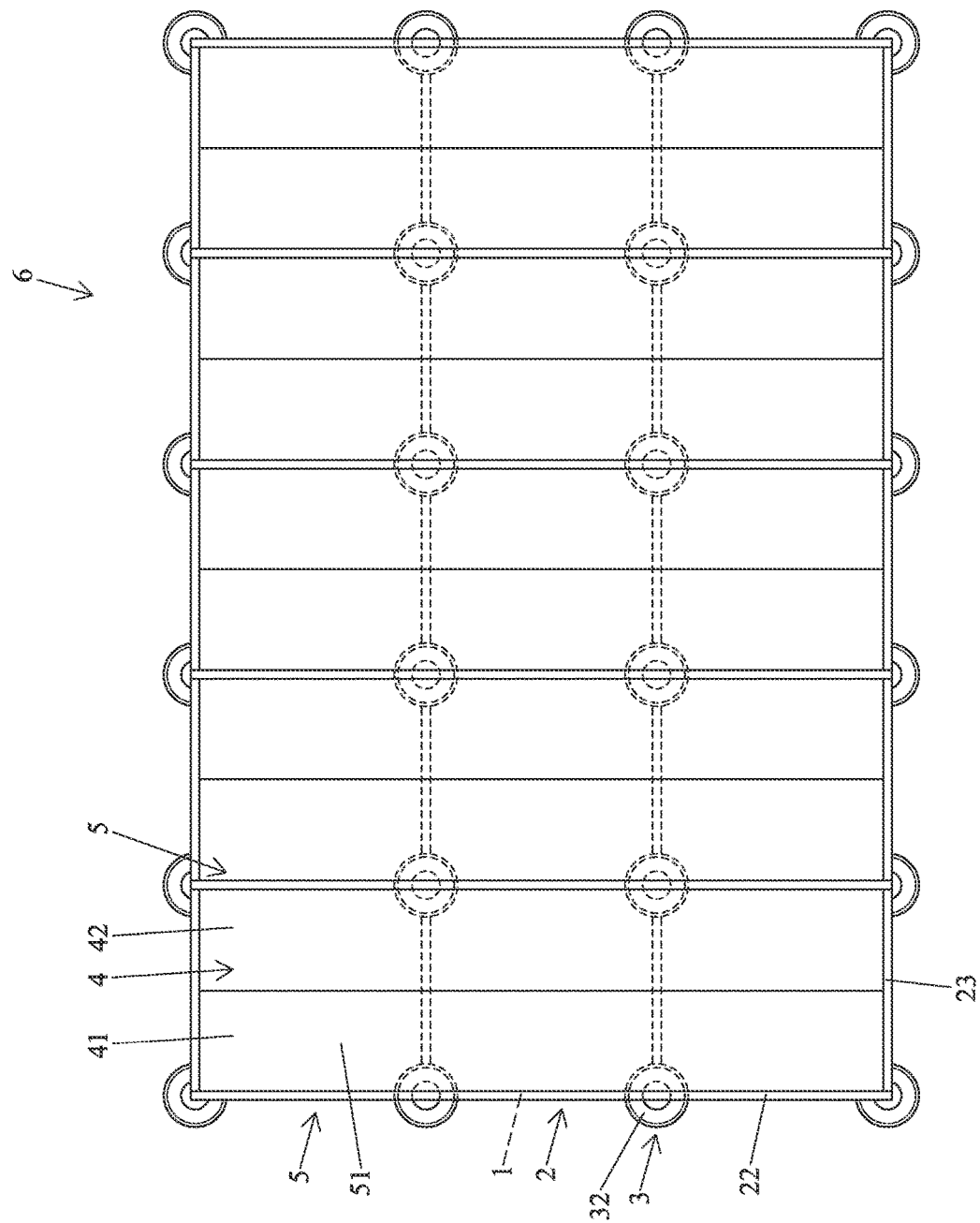
FIG. 3 is a schematic top view of the first embodiment of the present invention.
Figure 4:
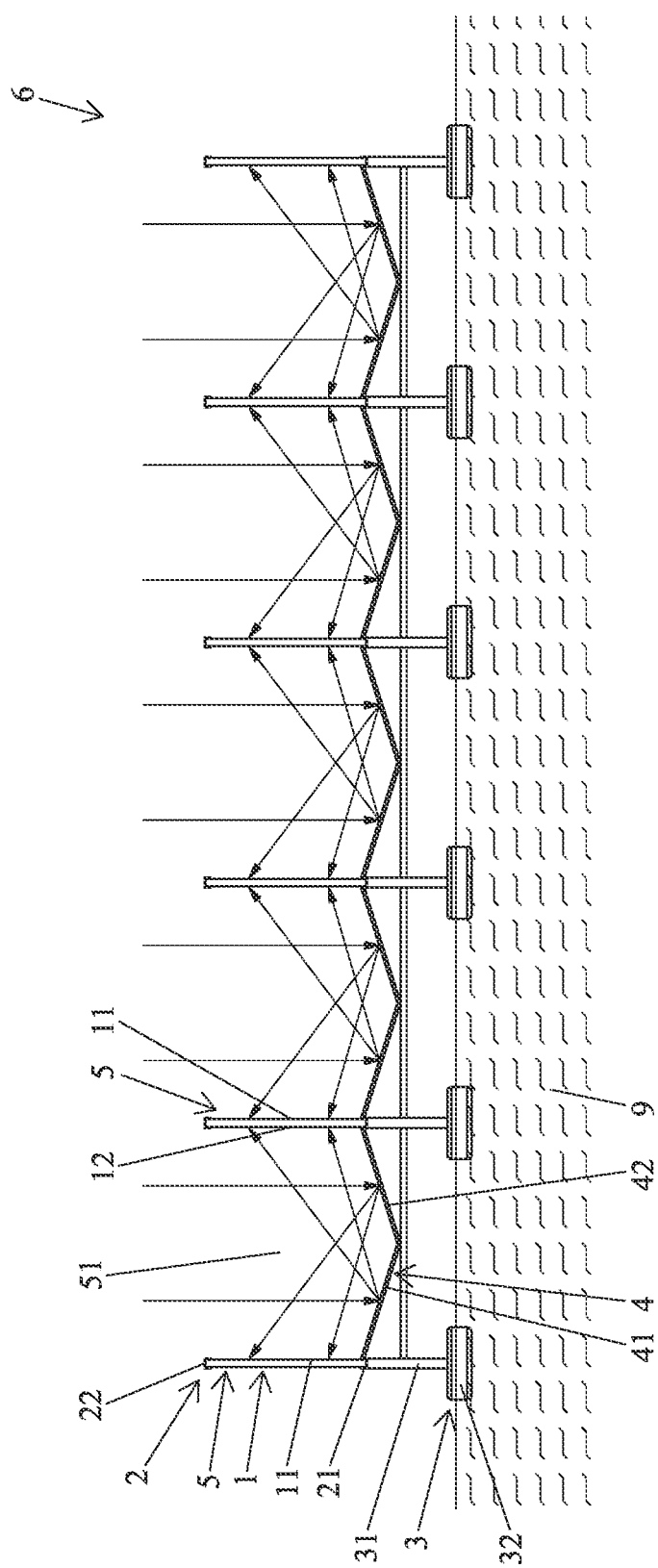
FIG. 4 is a schematic view illustrating power generation of the first embodiment of the present invention.

REFERENCE NUMBERS 1 solar panel 11 first light receiving face 12 second light receiving face
13 side face
2 frame unit 21 lower frame body 211 lower receiving groove
22 upper frame body 221 upper receiving groove 23 connecting frame
3 supporting unit 31 connecting post 32 float
4 reflecting device 41 first inclined board portion 411 guiding groove
42 second inclined board portion 421 guiding groove 43 sheet portion
431 protrusion 432 upper end 433 lower end
434 diffusing face
5 continuous solar power generation module 51 light-transmission spacing
6 array solar power generation device
7 diffusing film
8 transmission device 81 telescopic rod 82 connecting rod
821 connecting portion 831 guiding device 831 track
832 transmission member 833 motor 834 transmission belt
835 guiding wheel 9 water
1' solar panel 11' first light receiving face 12' second light receiving face
2' reflecting board

IMPLEMENTATION OF THE PRESENT INVENTION

Like elements having similar functions in the following embodiments of the present invention are designated by the same reference numbers. With reference to FIGS. 1-4, a first embodiment of the present invention comprises a plurality of solar panels 1, a frame unit 2, a supporting unit 3, and a plurality of reflecting devices 4. Each solar panel 1 includes oppositely disposed first and second light receiving faces 11, 12 which are generally parallel to each other and can receive light to generate electricity. A side face 13 extends in a direction perpendicular to the first and second light receiving faces 11, 12.

The frame unit 2 provides coupling of the plurality of solar panels 1 and enables the plurality of solar panels 1 to stand upright and be arranged continuously, such that the first and second light receiving faces 11, 12 extend in a direction perpendicular to the ground or a water surface, and the side faces 13 are aligned with each other, thereby forming a continuous solar power generation module 5. Furthermore, plural continuous solar power generation modules 5 are arranged in parallel to form an array solar power generation device 6. The frame unit 2 includes a plurality of lower frame bodies 21, a plurality of upper frame bodies 22, and a plurality of connecting frames 23. The lower frame body 21 is a rectilinear body and includes an upper end having a lower receiving groove 211 which receives a bottom portion of the continuous solar power generation module 5. Furthermore, the upper frame body 22 is a rectilinear body and includes a lower end having an upper receiving groove 221 which receives a top portion of the continuous solar power generation module 5. Furthermore, the connecting frame 23 interconnects adjacent upper frame bodies 22, such that adjacent continuous solar power generation modules 5 have the light-transmission spacing 51 therebetween.

The supporting unit 3 is disposed below the lower frame bodies 21 of the frame unit 2 and provides support on the ground or float on the water 9. The frame unit 3 includes a plurality of connecting posts 31 and a plurality of floats 32. Top ends of the connecting posts 31 are securely mounted to lower ends of the lower frame bodies 21, and the floats 32 are coupled with lower ends of the connecting posts 31. Furthermore, the floats 32 may be waste tires or any other floatable devices.

The reflecting device 4 is disposed in a lower end of the light-transmission spacing 51 between adjacent continuous solar power generation modules 5 and is configured to reflect light rays to the first light receiving face 11 of a continuous solar power generation module 5 and the second light receiving face 12 of another continuous solar power generation module 5. The reflecting device 4 includes first and second inclined board portions 41, 42 which are rectilinear sheets. A side of each of the first and second inclined board portions 41, 42 is coupled with a lower frame body 21 of a continuous solar power generation module 5. The other sides of the first and second inclined board portions 41, 42 are connected to each other. The connecting end is lower than the position of the bottom end of the continuous solar power generation module 5. The first and second inclined board portions 41, 42 can reflect light rays to the first and second light receiving faces 11, 12 of the solar panels 1.

The plurality of solar panels 1 of the present invention can be rapidly inserted into the upper and lower receiving grooves 221, 211 of the upper and lower frame bodies 22, 21 of the frame unit 2. The assembly is simple and easy. Furthermore, plural continuous solar power generation modules 5 can be rapidly assembled according to needs, thereby forming an array solar power generation device 6 having a large area. The present invention is applicable to be disposed on water 9, a swamp, a dry land, or other lands not suitable for cultivation, providing better applicability.

The present invention can respond to the angle of the sunlight to enable the first and second light receiving faces 11, 12 of the solar panels 1 to directly receive light to generate electricity. Furthermore, with reference to FIG. 4, in the present invention, when the sunlight is incident on the reflecting device 4 via the light-transmission spacing 51 between adjacent continuous solar power modules 5, the sunlight can be reflected by the first and second inclined board portions 41, 42 to the first and second light receiving faces 11, 12 of the solar panels 1 to enhance the power generation efficiency. The solar panels 1 of the present invention are disposed upright, such that the first and second light receiving faces 11, 12 are difficult to accumulate dust. Furthermore, when disposed on water 9, the reflecting device 4 can provide shield and heat insulation while providing cold protection as well as providing a better growing environment for creatures cultivated therebelow. Furthermore, the reflecting device 4 may also provide the function of a walkway providing people with convenient maintenance.

Figure 5:
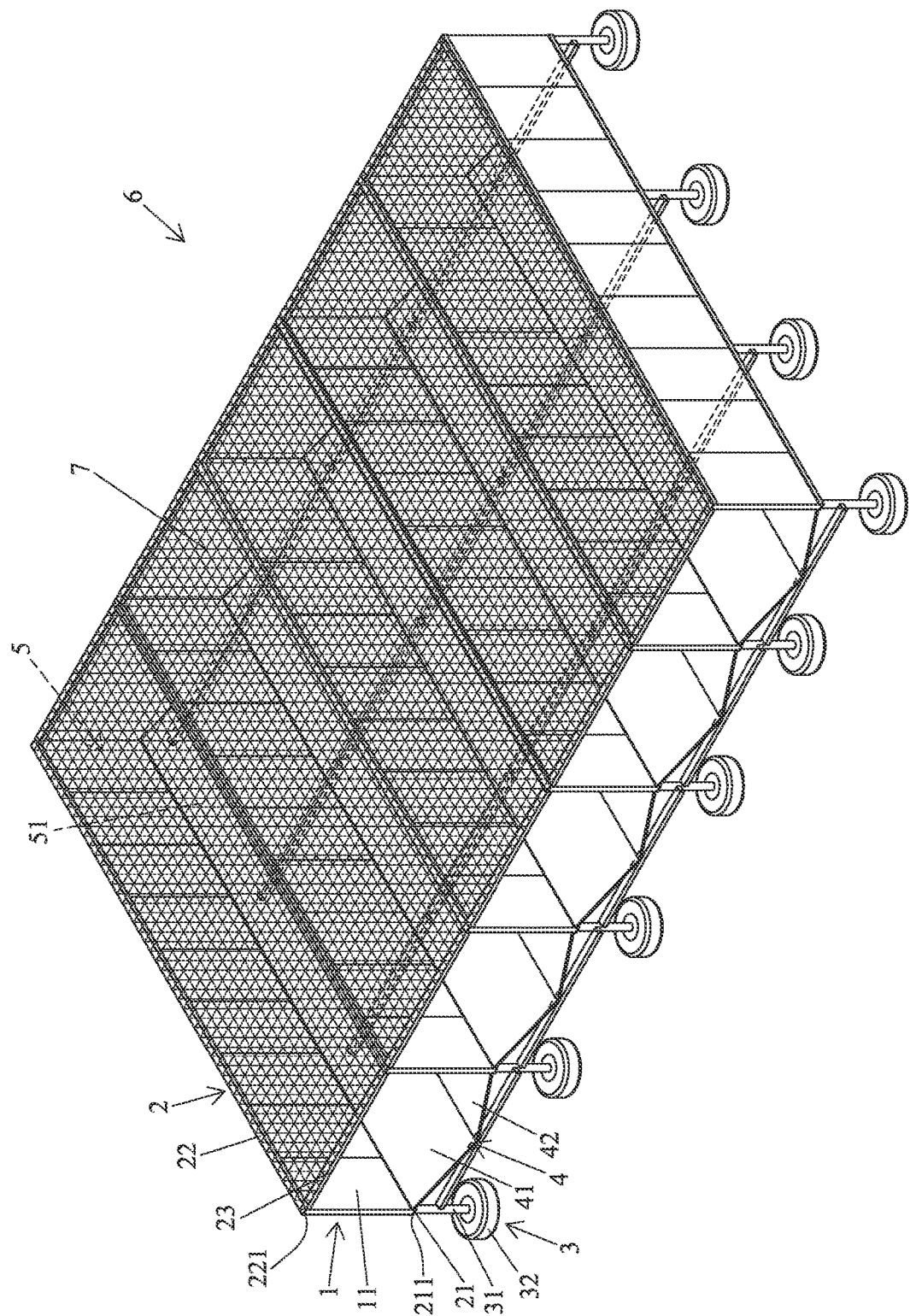
FIG. 5 is a perspective view of a second embodiment of the present invention.
Figure 6:
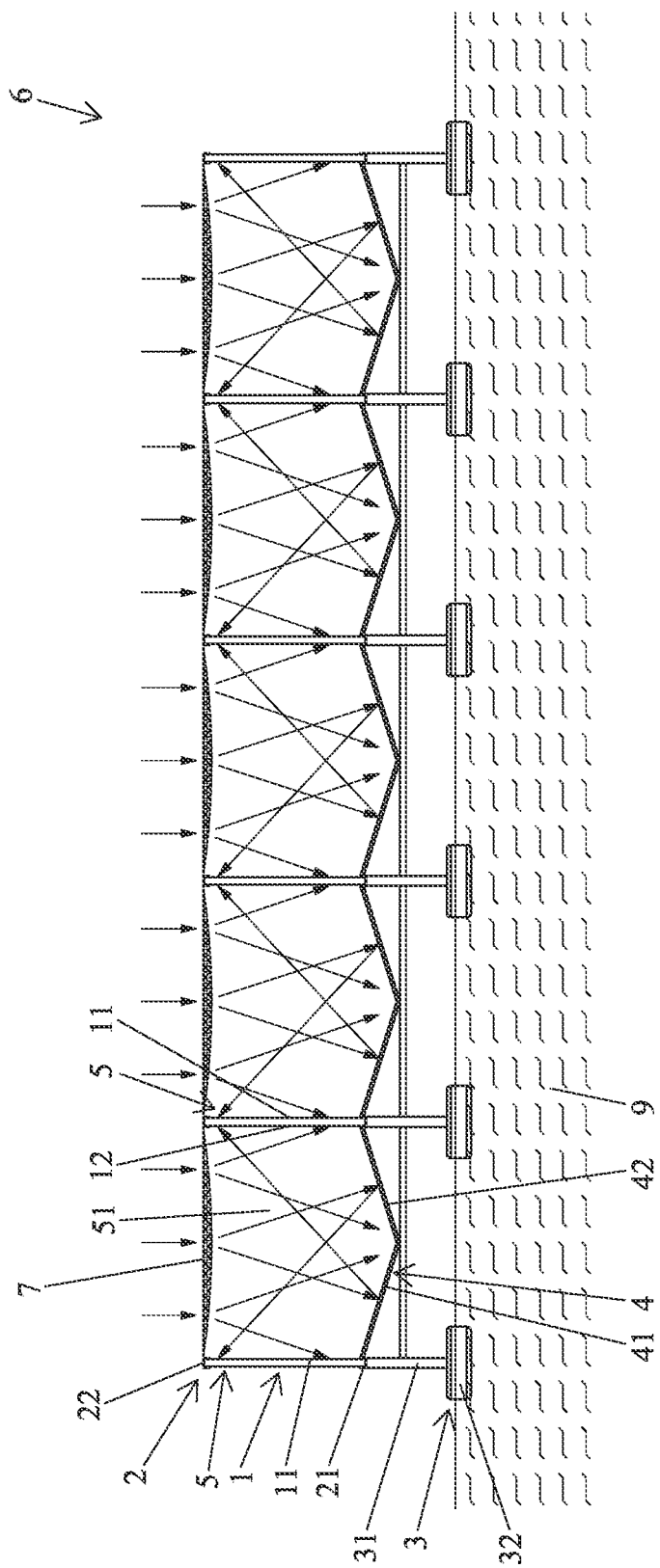
FIG. 6 is a schematic view illustrating power generation of the second embodiment of the present invention.
Figure 7:
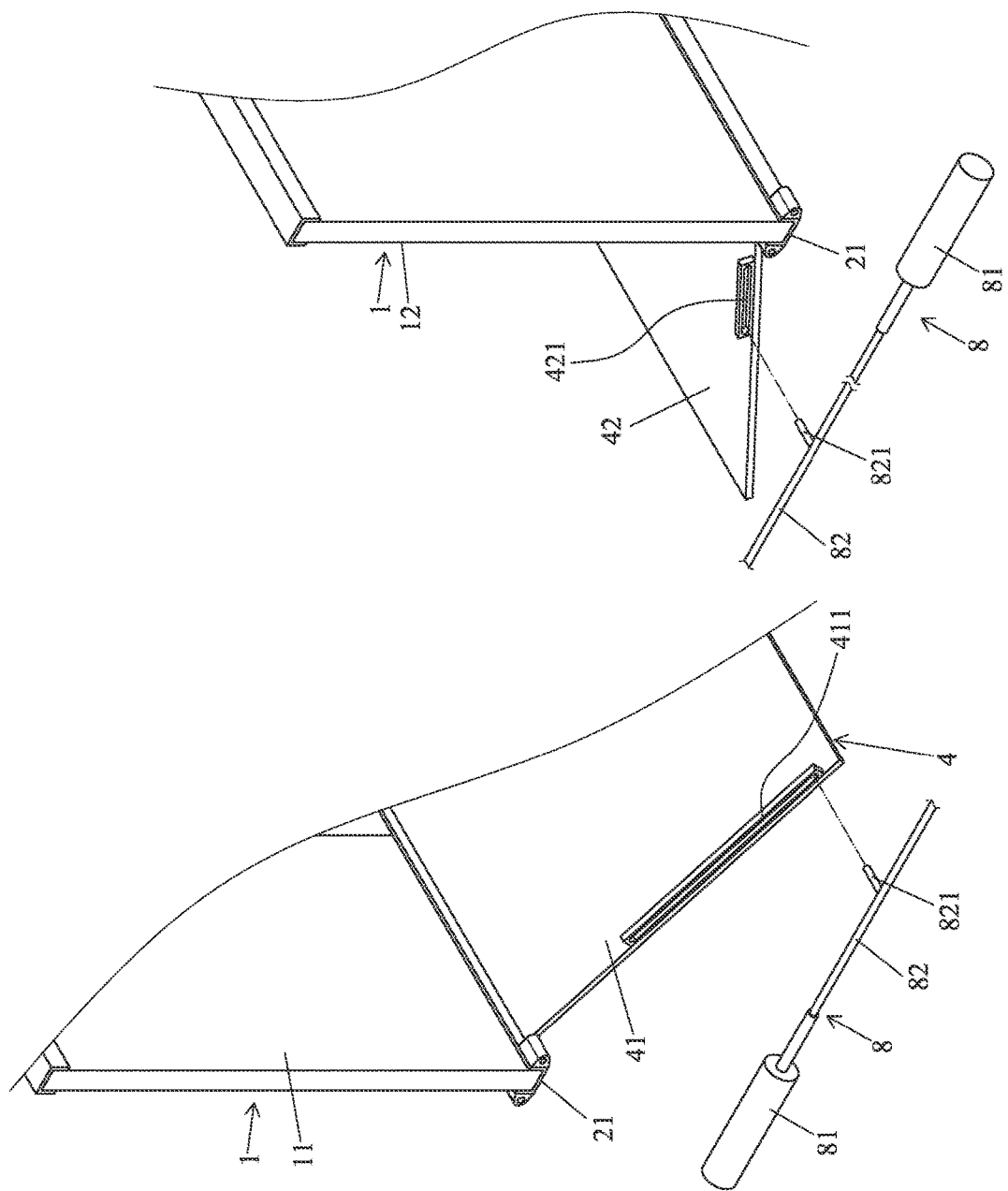
FIG. 7 is a partial, exploded, perspective view of a third embodiment of the present invention.
Figure 8:
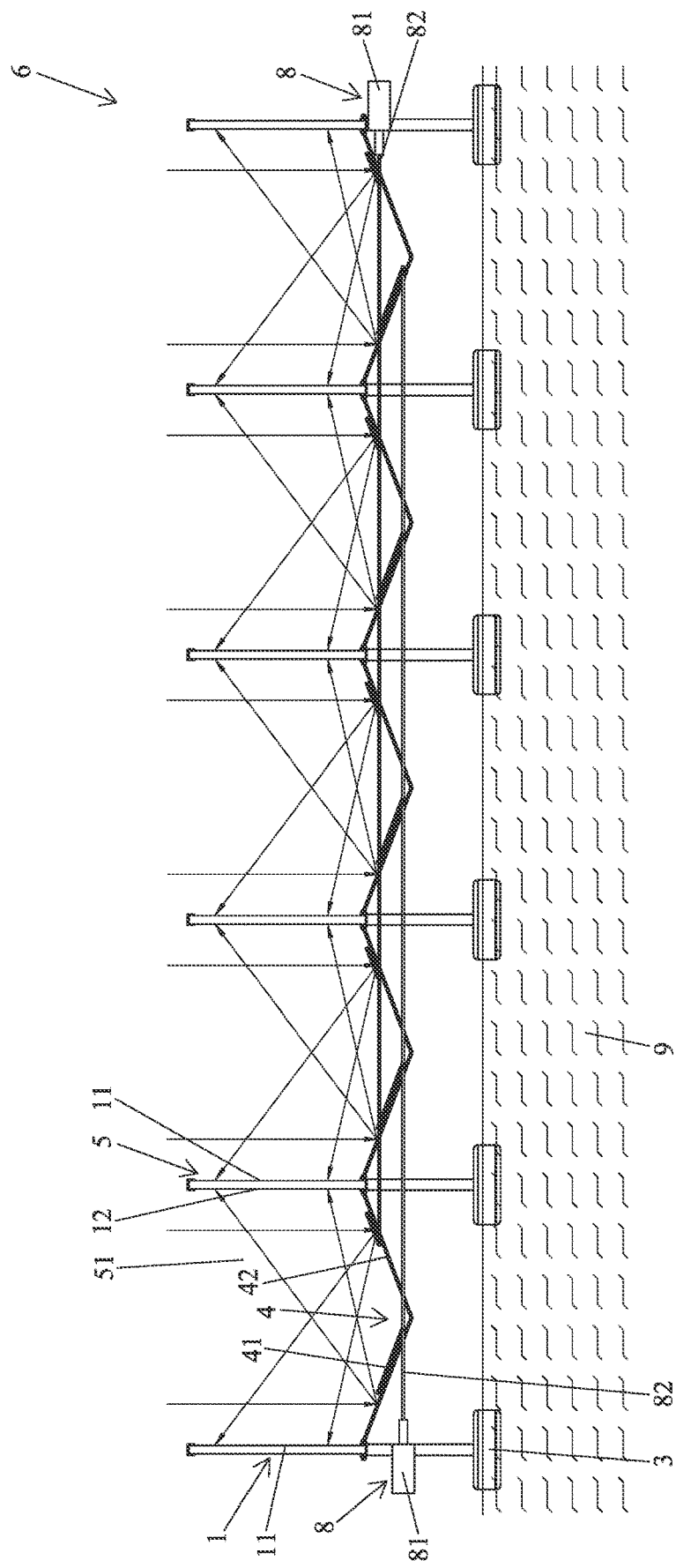
FIG. 8 is a schematic view illustrating reflecting devices of the third embodiment of the present invention in a closed state.

Please refer to FIGS. 5 and 6 showing a second embodiment of the present invention. The second embodiment is similar to the first embodiment, and the difference is that a diffusing film 7 for diffusing light rays is disposed on an upper end of the light-transmission spacing 51 of the adjacent continuous solar power generation modules 5. Furthermore, when the ambient light rays incident to the diffusing film 7, the light rays can be diffused downward in different directions to the first and second light receiving faces 11, 12 of the solar panels 1 and the reflecting devices 4, further enhancing the power generation efficiency.

Figure 9:
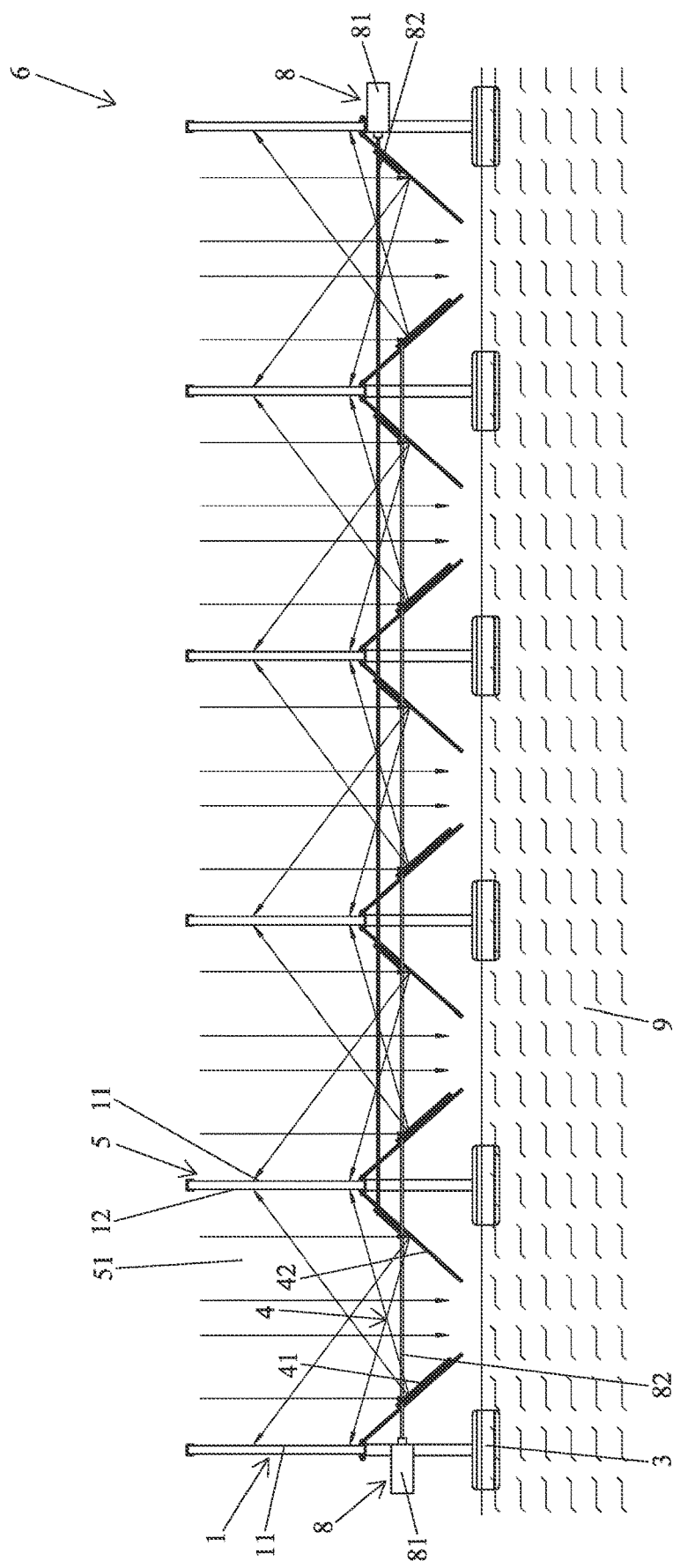
FIG. 9 is a schematic view illustrating the reflecting devices of the third embodiment of the present invention in an open state.

Please refer to FIGS. 7-10 showing a third embodiment of the present invention. The third embodiment is similar to the first embodiment, and the difference is that an end of each of the first and second inclined board portions 41, 42 of the reflecting device 4 is pivotably connected to the lower frame body 21 of a continuous solar power generation module 5, and another sides of the first and second inclined board portions 41, 42 are not connected. Furthermore, two transmission devices 8 are included. The two transmission devices 8 can respectively actuate the first inclined board portions 41 and the second inclined board portions 42 of plural reflecting devices 4 to proceed with opening and closing movements. The first and second inclined board portions 41, 42 include guiding grooves 411, 421. Furthermore, each transmission device 8 includes a telescopic rod 81 and a connecting rod 82. The connecting rod 82 of one of the transmission devices 8 includes plural connecting portions 821 concurrently coupled with the guiding grooves 411 of plural first inclined board portions 41. The connecting rod 82 of the other transmission device 8 includes plural connecting portions 821 concurrently coupled with the guiding grooves 421 of plural second inclined board portions 42. The two telescopic rods 81 can respond to the orientation of the sunlight and can be automatically or manually operated to control movements of the first and second inclined board portion 41, 42, while providing a solar tracking function to adjust the angle of reflection. Furthermore, as shown in FIG. 9, the spacing between the first and second inclined board portions 41, 42 can be controlled to control the light transmission rate projecting to the position below the reflecting device 4. Furthermore, the light rays below the water 9 or demanded by creatures can be controlled according to needs.

Figure 10:
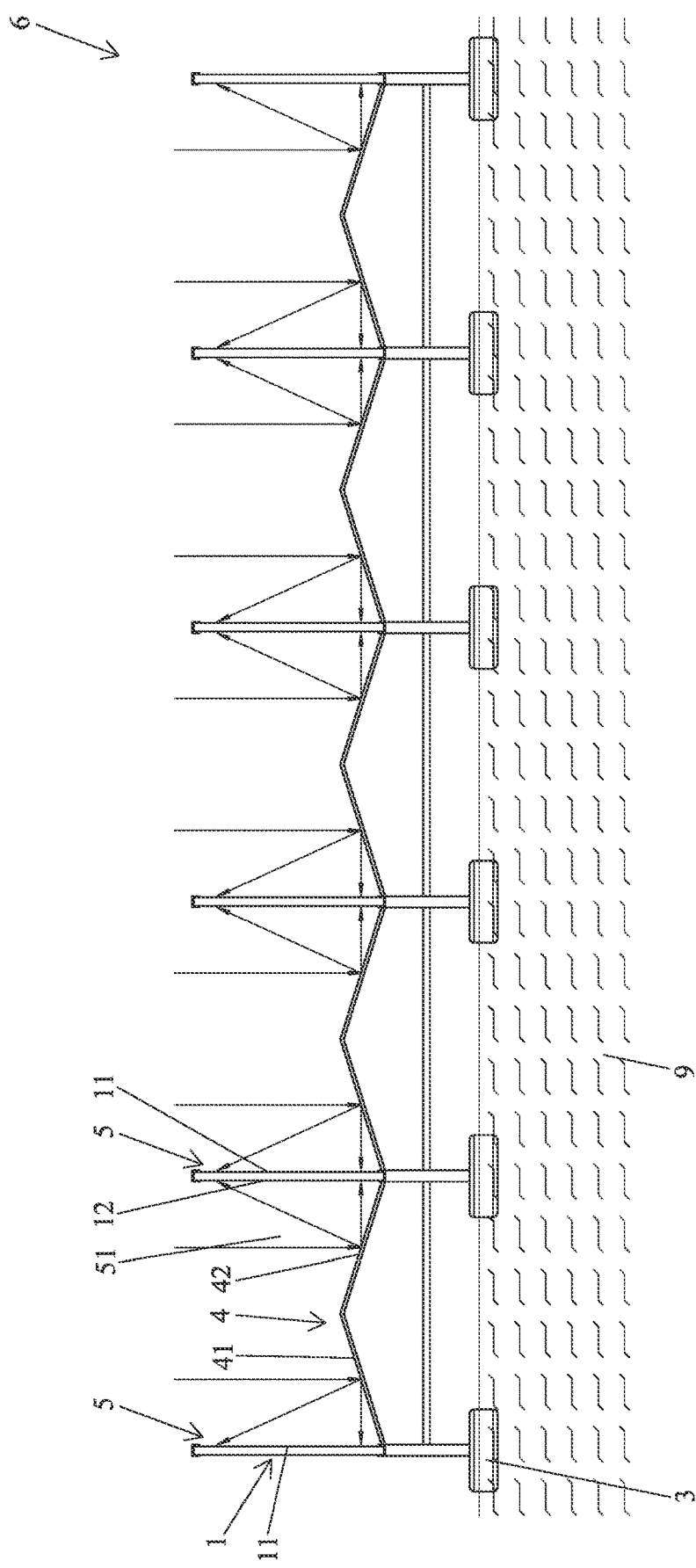
FIG. 10 is a schematic view illustrating power generation of a fourth embodiment of the present invention.
Figure 11:
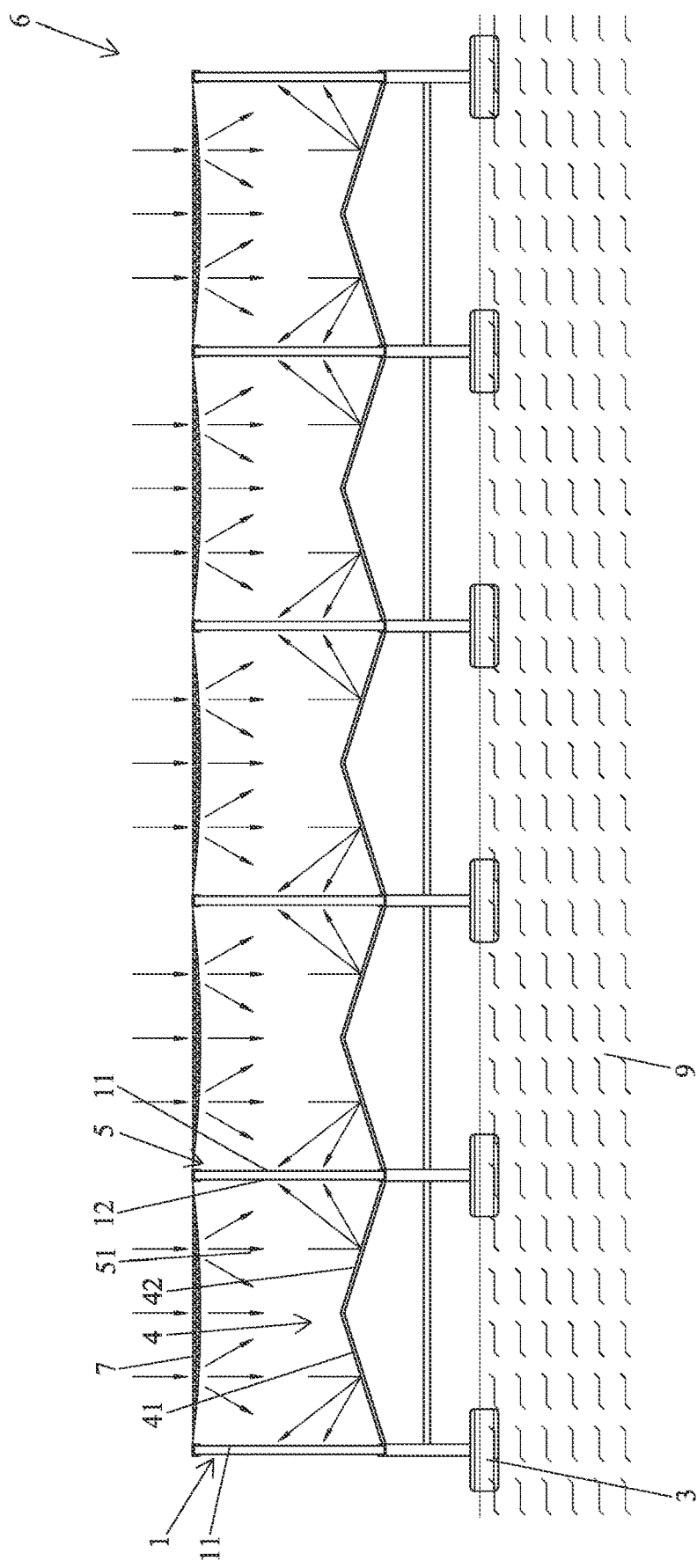
FIG. 11 is a schematic view illustrating power generation of a fifth embodiment of the present invention.

Please refer to FIG. 10 showing a fourth embodiment of the present invention. The fourth embodiment is similar to the first embodiment, and the difference is that the connecting position of the first and second inclined board portions 41, 42 of the reflecting device 4 is higher than a bottom end of the continuous solar power generation module 5 while providing a power generation effect similar to the first embodiment. Furthermore, as shown in FIG. 11, a fifth embodiment of the present invention is similar to the fourth embodiment, a diffusing film 7 for diffusing light rays may be disposed on top of the continuous solar power generation modules 5 and may diffuse light rays to enhance the power generation efficiency.

Figure 12:
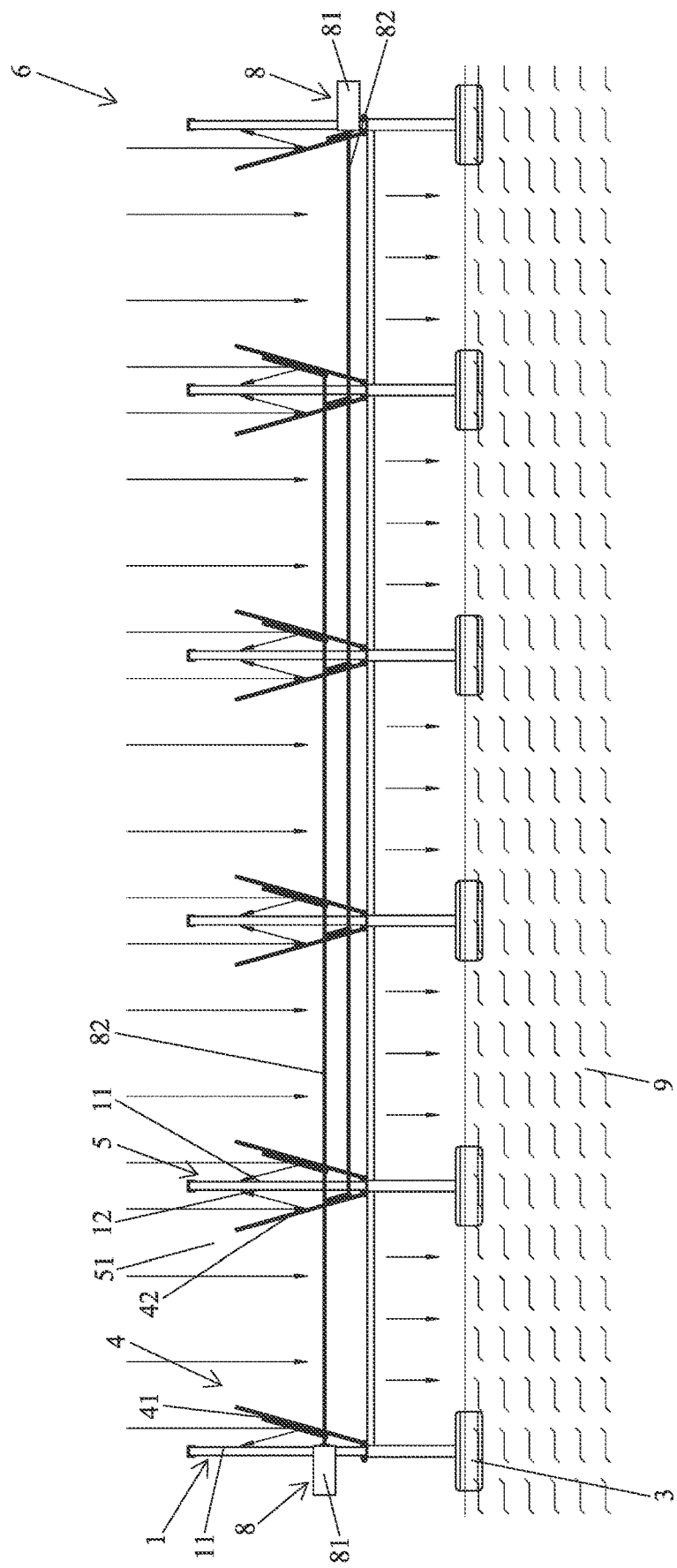
FIG. 12 is a schematic view illustrating the reflecting devices of a sixth embodiment of the present invention in an open state.
Figure 13:
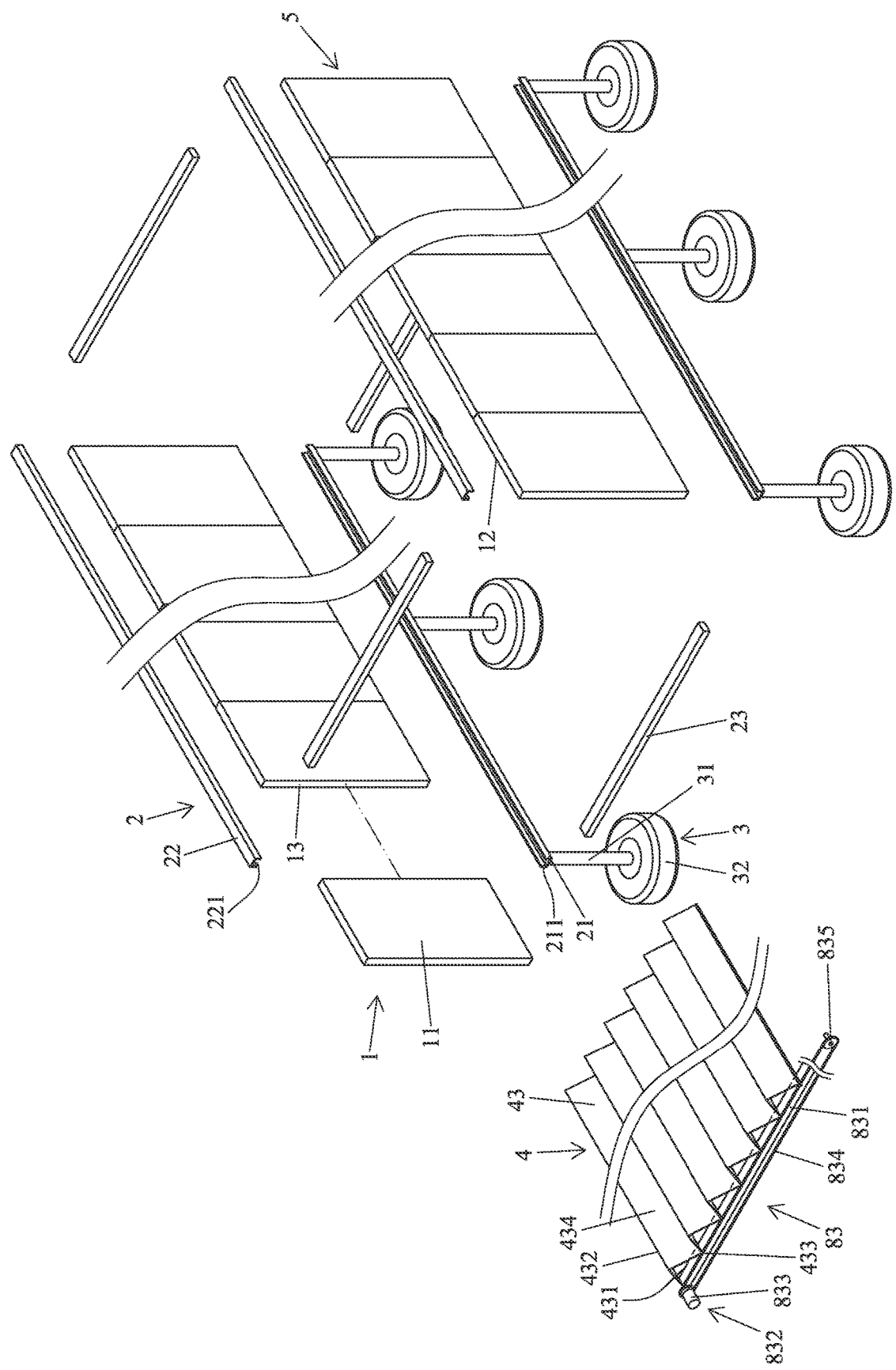
FIG. 13 is a partial, exploded, perspective view of a seventh embodiment of the present invention.
Figure 14:
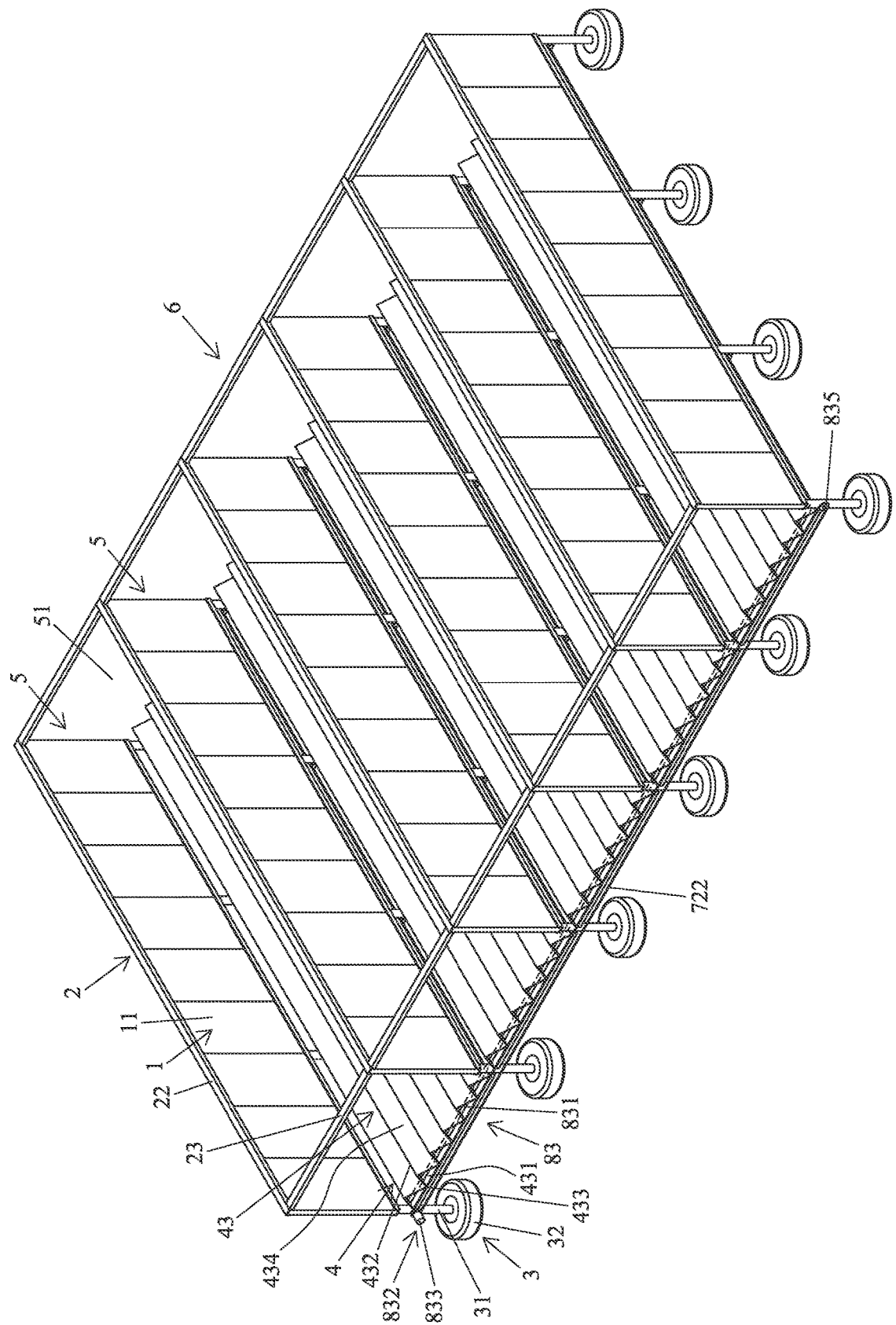
FIG. 14 is a perspective view of the seventh embodiment of the present invention after assembly.

Please refer to FIG. 12 showing a sixth embodiment of the present invention. The sixth embodiment is similar to the third and fourth embodiments. Transmission device 8 are disposed on the first and second inclined board portions 41, 42 of the reflecting device 4 and may control the angles of the first and second inclined board portions 41, 42 to provide a solar tracking function and to control the light transmission rate below the reflecting devices 4. (The figure shows an open state.)

Please refer to FIGS. 13-17 showing a seventh embodiment of the present invention. The seventh embodiment is similar to the first embodiment, and the main difference is in the reflecting device 4 and the guiding device 83. The reflecting device 4 includes plural sheet portions 43 assembled to form a plurality of protrusions 431 which protrudes upwardly. Adjacent ends of longer sides of the sheet portions 43 are connected. Each sheet portion 43 includes an upper end 432 protruding upward for connection and a lower end 431 for connection. Outer sides of adjacent sheet portions 43 which are on two sides of an associated upper end 432 have different oriental inclinations to form diffusing faces 443. Light rays projected onto the sheet portions 43 with different inclinations are reflected in different directions.

The guiding device 83 can guide the reflecting devices 4 to open and close and is disposed below the light-transmission spacing 51 between the continuous solar power generation modules 5. The guiding device 83 includes a track 831 and a transmission member 832. The track 831 is coupled with the lower end 433 of the reflecting device 4, and the lower end 433 is movable along the track 831. Furthermore, the transmission member 832 includes a motor 833, a transmission belt 834, and a guiding wheel 835. The transmission belt 834 is coupled with the motor 833 and a sheet portion 43 of each reflecting device 4. The guiding wheel 835 is disposed on a side of the track 831 and wound by the transmission belt 834. The motor 833 may be controlled to actuate the sheet portions 43 of the reflecting devices 4 to open or close and to adjust the angle of reflection of the sheet portions 43. Furthermore, the motor 833 may also respond to the change in the ambient illumination to automatically control opening or closing of the reflecting devices 4.

Figure 15:
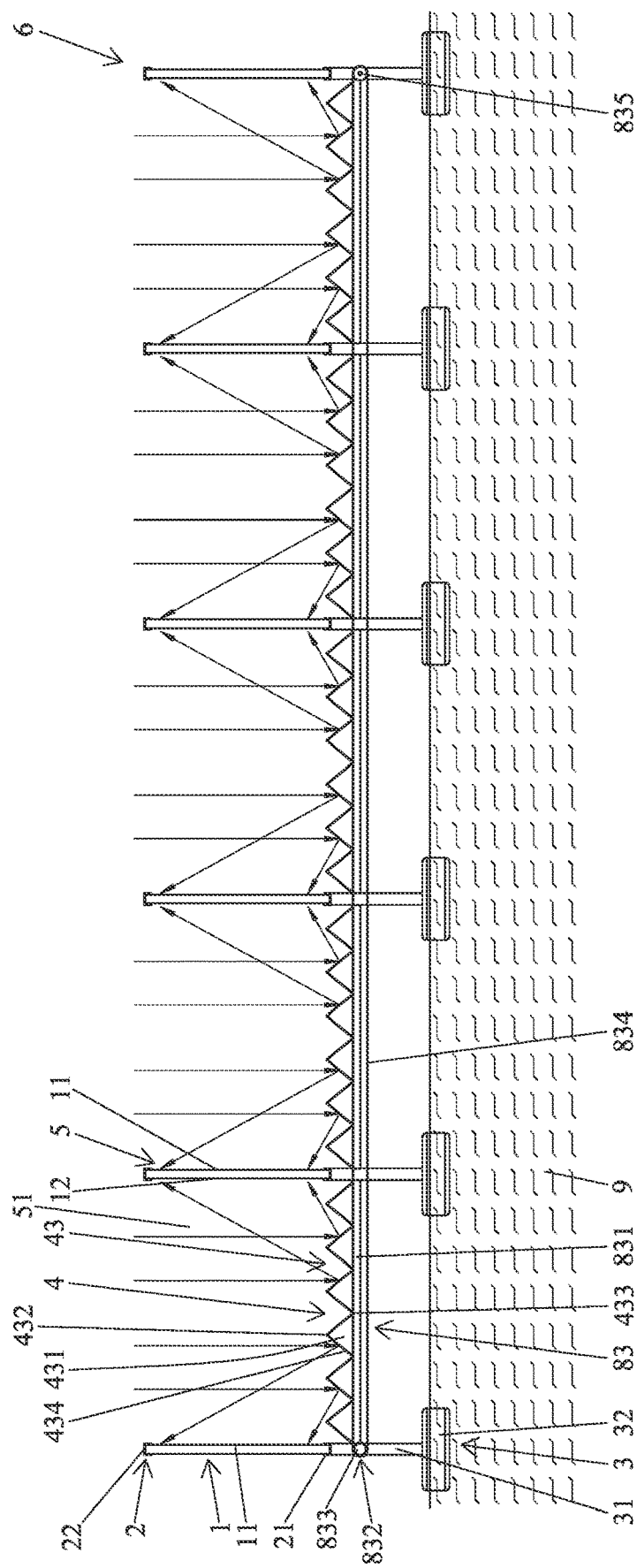
FIG. 15 is a schematic view illustrating power generation of the seventh embodiment of the present invention.

As shown in FIG. 15, this embodiment may respond to the angle of sunlight to enable the first and second light receiving faces 11, 12 of the solar panels 1 to directly receive light to generate electricity. Furthermore, when the sunlight is incident on the reflecting devices 4 via the light-transmission spacing 51 between the continuous solar power generation modules 5, the sunlight is reflected to the first and second light receiving faces 11, 12 of the solar panels 1 by the diffusing faces 434 of the reflecting devices 4, thereby enhancing the power generation efficiency. A reflecting device 4 of this embodiment includes plural diffusing faces 434 to provide a reflecting effect of light rays in different angles better than the first and fourth embodiments.

In this embodiment, the transmission member 832 may be actuated according to needs, and the transmission belt 834 can be moved to actuate the sheet portions 43 of the reflecting device 4 to thereby change the angle of reflection of the diffusing faces 434, which may provide a solar tracking effect to enhance the power generation efficiency.

Figure 16:
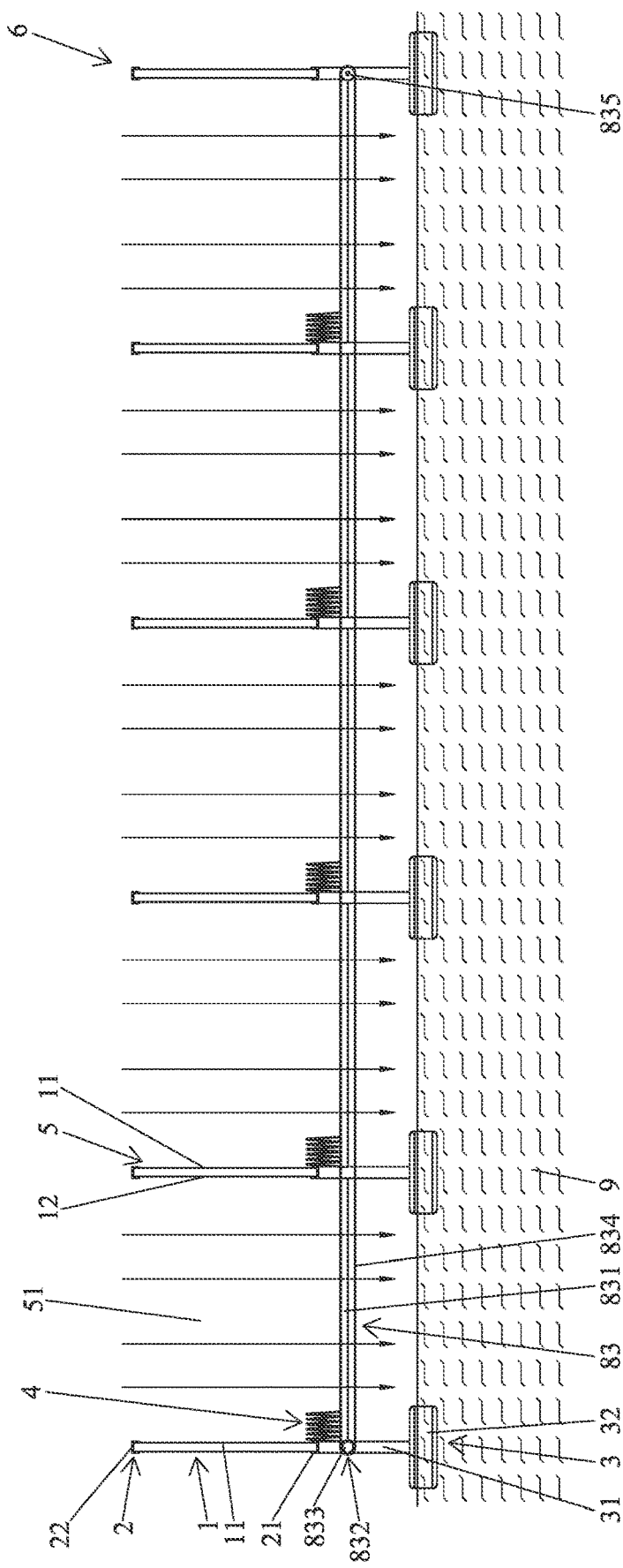
FIG. 16 is a schematic view illustrating the reflecting devices of the seventh embodiment of the present invention in a closed state.
Figure 17:
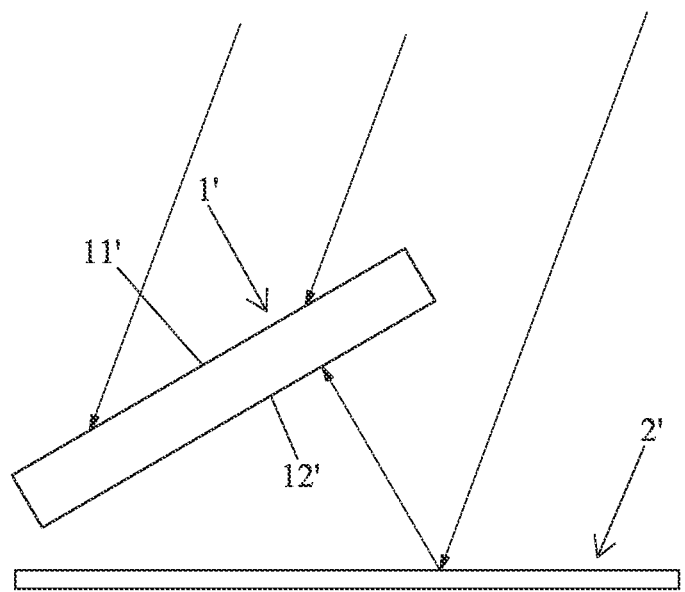
FIG. 17 is a schematic view of a conventional solar power generation equipment.

As shown in FIG. 16, when this embodiment is disposed on water 9, the motor 833 of the transmission member 832 can be activated to actuate the transmission belt 834 and the reflecting devices 4 to proceed with the closing movement. Furthermore, a space permitting light transmission to the water 9 therebelow is provided below adjacent continuous solar power generation module 5. Therefore, the quantity of light irradiating the water 9 can be controlled according to needs, thereby improving the growing environment suitable for the aquatic creatures.

Furthermore, similar to the second embodiment, this embodiment may also include a diffusing film capable of diffusing light rays (not shown in the figure) disposed on top of adjacent continuous solar power generation modules. Furthermore, ambient light rays may be diffused through the diffusing film and downward to the reflecting devices reflecting light rays and directly reflecting to the first and second light receiving faces of the solar panels to enhance the power generation efficiency.

Therefore, based on the above description, the present invention can provide the effects of easy installation, enhanced power generation efficiency, and enhanced applicability. The foregoing embodiments are examples of the present invention, not limitation to the present invention. All equivalent changes made in accordance with the spirit of the present invention should also fall within the scope of the present invention.

The invention claimed is:

1. An array solar power generation device comprising:
a plurality of solar panels each including oppositely disposed first and second light receiving faces for receiving light to generate electricity and a side face extending in a direction perpendicular to the first and second light receiving faces;
a frame unit providing coupling of the plurality of solar panels and enabling the plurality of solar panels to stand upright and be arranged continuously, such that the first and second light receiving faces extend in a direction perpendicular to a ground or a water surface, and the side faces are aligned with each other, thereby forming a continuous solar power generation module, with plural continuous solar power generation modules being arranged in parallel and a light-transmission spacing being formed between adjacent continuous solar power generation modules;
a supporting unit disposed below the frame unit; and
at least one reflecting device disposed in a lower end of the light-transmission spacing between the adjacent continuous solar power generation modules and configured to reflect light rays to the first and second light receiving faces of the continuous solar power generation modules, wherein the at least one reflecting device includes first and second inclined board portions which are rectilinear sheets, a side of each of the first and second inclined board portions is pivotably connected to a lower end of the continuous solar power generation module, further comprising at least one transmission device, with the transmission device being configured to actuate the first inclined board portion and the second inclined board portion of plural reflecting devices to proceed with opening and closing movements.

2. The array solar power generation device as set forth in claim 1, wherein the first and second inclined board portions include guiding grooves, further comprising two transmission devices, with each transmission device including a telescopic rod and a connecting rod, with the connecting rod of one of the transmission devices including plural connecting portions concurrently coupled with the guiding grooves of plural first inclined board portions, with the connecting rod of the other transmission device including plural connecting portions concurrently coupled with the guiding grooves of plural second inclined board portions, and with movement of the two telescopic rods controlling the opening and closing movements of the first and second inclined board portion.

3. An array solar power generation device comprising:
 a plurality of solar panels each including oppositely disposed first and second light receiving faces for receiving light to generate electricity and a side face extending in a direction perpendicular to the first and second light receiving faces;
 a frame unit providing coupling of the plurality of solar panels and enabling the plurality of solar panels to stand upright and be arranged continuously, such that the first and second light receiving faces extend in a direction perpendicular to a ground or a water surface, and the side faces are aligned with each other, thereby forming a continuous solar power generation module, with plural continuous solar power generation modules being arranged in parallel and a light-transmission spacing being formed between adjacent continuous solar power generation modules;
 a supporting unit disposed below the frame unit;
 at least one reflecting device disposed in a lower end of the light-transmission spacing between the adjacent continuous solar power generation modules and configured to reflect light rays to the first and second light receiving faces of the continuous solar power generation modules, wherein the at least one reflecting device includes plural sheet portions assembled to form a plurality of protrusions which protrudes upwardly, adjacent ends of longer sides of the sheet portions are connected, each sheet portion includes an upper end protruding upward for connection and a lower end for connection, outer sides of adjacent sheet portions which are on two sides of an associated upper end have different oriental inclinations to form diffusing faces, and light rays projected onto the sheet portions with different inclinations are reflected in different directions; and
 a guiding device, with the guiding device including a track and a transmission member, with the track being coupled with the lower end of the reflecting device, with the lower end being movable along the track, with the transmission member including a motor, a transmission belt, and a guiding wheel, with the transmission belt being coupled with the motor and at least one sheet portion of each reflecting device, with the guiding wheel being disposed on a side of the track and wound by the transmission belt, and with the motor being controlled to actuate the sheet portions of the reflecting device to open or close and to adjust an angle of reflection of the sheet portions.

* * * * *